United States Patent [19]

Schrider

[11] 4,031,239
[45] June 21, 1977

[54] CYCLOPROPANECARBOXYLATES FOR SYSTEMIC CONTROL OF ECTOPARASITES

[75] Inventor: Michael Stanley Schrider, South Bound Brook, N.J.

[73] Assignee: American Cyanamid Company, Stamford, Conn.

[22] Filed: Dec. 22, 1975

[21] Appl. No.: 643,225

Related U.S. Application Data

[63] Continuation-in-part of Ser. No. 550,107, Feb. 13, 1975, abandoned.

[52] U.S. Cl. .............................. 424/304; 424/305
[51] Int. Cl.² ................. A01N 9/20; A61K 31/275
[58] Field of Search ........................... 424/304, 305

[56] References Cited

UNITED STATES PATENTS

| | | | |
|---|---|---|---|
| 3,666,789 | 5/1972 | Itaya et al. | 424/305 |
| 3,835,176 | 9/1974 | Matsuo et al. | 424/304 |

*Primary Examiner*—Dale K. Ore
*Attorney, Agent, or Firm*—H. G. Jackson

[57] ABSTRACT

The invention is a method for controlling ectoparasites using cyclopropanecarboxylate compounds having systemic activity in warm-blooded animals.

15 Claims, No Drawings

CYCLOPROPANECARBOXYLATES FOR SYSTEMIC CONTROL OF ECTOPARASITES

CROSS REFERENCE TO RELATED APPLICATION

This application is a continuation-in-part of application Ser. No. 550,107, filed Feb. 13, 1975, copending, now abandoned.

SUMMARY OF THE INVENTION

The invention is a method for the systemic control of ectoparasites which attack warm-blooded animals by administering to the animals a cyclopropanecarboxylate of the formula:

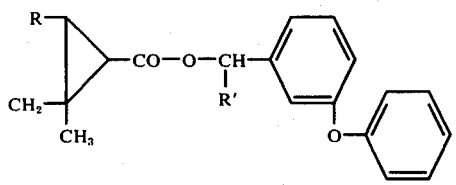

ps wherein R is 2,2-dichlorovinyl- or 2-methyl-propenyl- and R' is hydrogen or cyano.

BACKGROUND OF THE INVENTION

1. Field of the Invention

The field of the invention is the use of cyclopropanecarboxylates for systemic control of ectoparasites on animals.

2. The Prior Art

Ixodidae, or hard ticks, are generally categorized as one-host, two-host or three-host ticks. They sustain themselves and their species by attaching to a host animal and feeding on the blood and bodyfluids thereof. Engorged females drop from the host animal and lay their eggs (2,000 to 20,000) in a niche on the ground or in some sheltered area where hatching occurs. The larvae then seek a host from which to obtain a blood meal and depending on whether the tick is a one, two or three-host tick may drop off the host to molt.

Ixodid ticks are responsible for the transmission and propagation of a great many human and animal diseases throughout the world. Those ticks of major economic importance include Boophilus spp., Rhipicephalus spp, Ixodes spp, Hyalomma spp., Amblyomma spp., and Dermacentor spp. They are vectors for disease, tick paralysis and tick toxicosis. A single tick species can cause paralysis of several different mammals, and several tick species can cause paralysis in a particular host. Tick-borne diseases, such as Sweating Sickness, Babesiosis, Anaplasmosis, Theileriosis and Heartwater, have been and are responsible for the death and/or debilitation of a vast number of animals throughout the world each year. Ticks are responsible for great economic losses in livestock production in the world today. Such losses are, of course, attributable not only to death, but also to damaged hides, loss in growth rate, reduction in milk production and reduced grade of meat animals.

Although the debilitating effects of tick and other pest infestation of animals has been recognized for years, and tremendous strides have been made in tick control programs, no entirely satisfactory method for controlling or eradicating these parasites has been forthcoming. Topical treatment of tick-infested and other ectoparasite plagued animals with chemical ectoparasiticidal agents, such as the chlorinated hydrocarbons, including benzene hexachloride (BHC), DDT, toxaphene, chlordane and aldrin; the organophosphorus compounds, including Delnav, ethion and coumaphos, have been partially successful in controlling ectoparasite populations. However, certain species of ectoparasites have become resistant to the chlorinated hydrocarbons and the organophosphates.

Netherlands Pat. No. 7,307,130, issued Nov. 27, 1973, describes a broad class of cyclopropanecarboxylic acid ester derivatives which include the compounds I have found to be effective against ectoparasites. U.S. Pat. 3,835,176 (1974) teaches α-cyanobenzyl cyclopropenecarboxylates. The patentees do not, of course, suggest the systemic method of the present invention.

DETAILED DESCRIPTION

The invention provides a method for the systemic control of insecticidal and acaracidal agents which attack warm-blooded or homothermic animals by employing systemic cyclopropanecarboxylates that provide excellent control of ectoparasites. In the invention, cyclopropanecarboxylates of the formula:

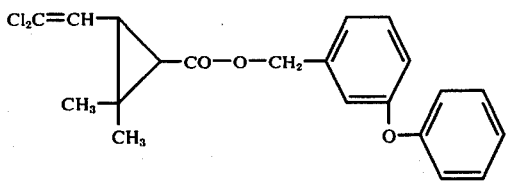

Cyclopropanecarboxylic acid,
3-(2,2-dichlorovinyl)-2,2-dimethyl-
m-phenoxybenzyl ester, cis and trans isomer

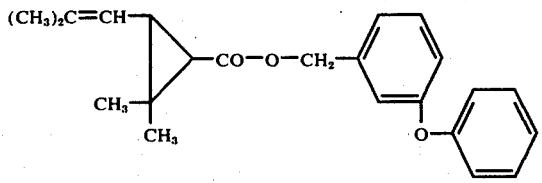

Cyclopropanecarboxylic acid,
2,2-dimethyl-3-(2-methyl-propenyl)-
m-phenoxybenzyl ester, cis and trans isomer

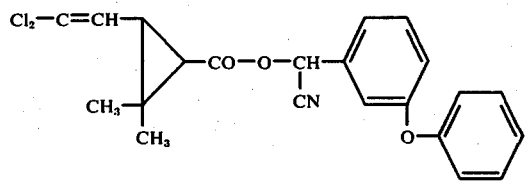

Cyclopropanecarboxylic acid,3-(2-2-dichlorovinyl)-
2,2-dimethyl-α-cyano-m-phenoxybenzyl ester, cis and
trans isomer or

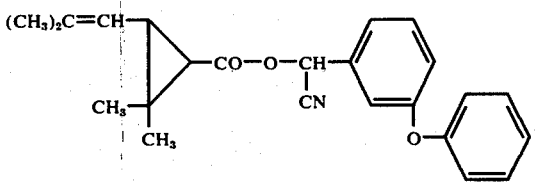

Cyclopropenecarboxylic acid, 2,2-dimethyl-3-
(2-methyl-propenyl)-α-cyano-m-phenoxybenzylester
cis and trans isomer.

are administered to the animals orally or parenterally in amounts ranging from 0.01 to about 600 mg per kilogram animal body weight and preferably from about 100 mg to 400 mg per kilogram animal body weight.

As indicated above, the systemic insecticidal and acaricidal agents of the invention may be administered orally or parenterally. When given orally, they may be in any convenient oral form of medication, such as a capsule, tablet or as an oral drench.

The agents may also be incorporated in a nutritionally balanced animal feed in the range of 0.01 to 2.5% by weight of feed and preferably 0.01 to 1.0% by weight of feed. They may also be added to the animal drinking water with the aid of a pharmaceutically acceptable dispersing or emulsifying agent.

If desired, the systemic agents may be introduced into the body of the animal by subcutaneous, intramuscular or intraperitoneal injection. The manner of administration of the systemic agents is not particularly important, so long as the prescribed amounts of systemic agents are introduced into the body of the animal where it may be distributed by the action of the circulatory system.

Advantageously, the above-identified compounds are highly effective systemic ixodicidal agents. They have relatively low mammalian toxicity and are effective for protecting animals, particularly domestic and farm animals, such as dogs, cats, cattle, sheep, horses and the like, from attack by ticks. They can be used to control a wide variety of ixodid ticks, including Boophilus spp., Amblyomma spp., Rhipicephalus spp., Dermacentor spp., and Hyalomma spp.

The invention is exemplified by the following nonlimiting examples.

EXAMPLE 1

Determination of Systemic Ixodicidal Activity of Cyclopropanecarboxylic acid, 3-(2,2-dichlorovinyl)-2,2-dimethyl-m-phenoxybenzyl ester (mixture of cis- trans isomers) Against the three-host tick Rhipicephalus sanguineus.

Albino guinea pigs are housed individually and fed guinea pig chow and water ad libitum. One leaf of cabbage per day is also given to each guinea pig.

The diet employed in these tests is as follows:
Crude protein not less than 18.0%
Crude fat not less than 4.0%
Crude fiber not more than 16.0%
Added minerals not more than 3.5%
Ash not more than 7.0%
and consists of the following ingredients: Ground wheat, ground yellow corn, dried skimmed milk, soybean meal, dehydrated alfalfa meal, cane molasses, wheat middlings, animal fat preserved with BHA, vitamin $B_{12}$ supplement; riboflavin supplement, cholin chloride, calcium pantothenate, thiamin, niacin, folic acid, ascorbic acid, vitamin A supplement, D activated sterol (source of Vitamin $D_3$), methionine hydroxy analogue calcium, pyridoxine hydrochloride, vitamin E supplement, dicalcium phosphate, calcium carbonate, iodized salt, copper oxide sulfate, iron sulfate, iron oxide, manganous oxide, cobalt carbonate, zinc oxide.

To the shaved back of each guinea pig, a capsule made from a 2 inch spud gasket, with the base ground down to provide greater flexibility, is glued using 3M adhesive no. 8001. Five male and five female adult Rhipicephalus sanguineus ticks are placed inside the capsule and allowed to attach to the guinea pig. A gauze material is fastened over the top of the gasket to prevent the ticks from escaping.

The guinea pigs are given a daily oral dose by gelatin capsule of either 400 or 100 mg per kilogram body weight of the test compound. The ticks do not appear to be affected for about 3 days after the initial treatment except for slight color changes and some reduction in size, but become moribund and die shortly thereafter. The following test data obtained:

| Daily oral dose (mg/kg) | % Tick Mortality |
|---|---|
| 400 | 100 |
| 100 | 80 |
| control | 0 |

EXAMPLE 2

Determination of Systemic Ixodicidal Activity of Cyclopropanecarboxylic acid, 3-(2,2-dichlorovinyl)-2,2-dimethyl-, m-phenoxybenzyl ester, cis- trans (23–77%) against the Three-host Tick Dermacentor variabilis.

By the method of Example 1 the efficacy of the test compound for controlling the above-identified tick species is demonstrated. The Dermacentor variabilis ticks are somewhat less susceptible to the test compound and after about 5 days become moribund and die shortly thereafter.

The data obtained are as follows:

| Dialy oral dose (mg/kg) | % Tick Mortality |
|---|---|
| 400 | 80 |
| 100 | 0 |
| control | 0 |

Results comparable to those in the Examples are obtained with the ixodicide, cyclopropanecarboxylic acid, 2,2-dimethyl-3-(2-methylpropenyl)-m-phenoxybenzyl ester, trans and cis.

EXAMPLE 3

Animal Systemic Insecticidal Activity

To determine the effectiveness of the compounds of the invention as animal systemic insecticidal agents, test compounds are mixed in 10% acetone-90% sesame oil and administered by gavage to mice each at 25, 100 and/or 400 mg/kg of animal body weight.

Adult, one day old, unfed flies Stomoxys calcitrans are then exposed to the mice for 18 hours to permit them to feed on said mice. Mortality counts are made at 24 hours and data obtained are reported below as percent control of stable flies.

TABLE

| Compound | No. Mice Treated | Dose mg/kg | No. of Flies | % Control of Stable Flies |
|---|---|---|---|---|
| (structure 1) | 2<br>2<br>2 | 400<br>100<br>25 | 20<br>20<br>20 | 96<br>80<br>63 |
| (structure 2) | 2<br>2<br>2 | 400<br>100<br>25 | 20<br>20<br>20 | 100<br>80<br>30 |
| (structure 3) | 2<br>2 | 100<br>25 | 20<br>20 | 100<br>36 |

I claim:

1. A method for the systemic control of ectoparasites which attack warm-blooded animals comprising orally or parenterally administering to the animals a systemically effective amount against the parasites of a cyclopropanecarboxylic acid of the formula:

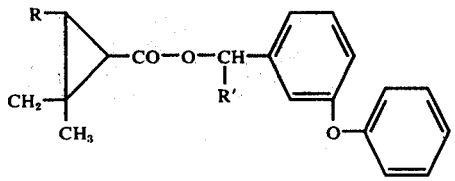

wherein R is 2,2-dichlorovinyl- or 2-methyl-propenyl- and R' is hydrogen or cyano.

2. A method according to claim 1 for the control of ixodid ticks, wherein the compound cyclopropanecarboxylic acid, 3-(2,2-dichlorovinyl)-2,2-dimethyl-m-phenoxybenzyl ester, cis- trans isomer is administered orally in amounts of 0.01 mg to 600 mg per kilogram animal body weight.

3. A method according to claim 1 for the control of ixodid ticks wherein the compound cyclopropanecarboxylic acid, 2,2-dimethyl-3-(2-methyl-propenyl)-m-phenoxybenzyl ester cis and trans isomersis administered orally in amounts of 0.01 mg to 600 mg per kilogram animal body weight.

4. A method according to claim 2, wherein the compound is administered orally in amounts of 100 mg to 400 mg per kilogram animal body weight.

5. A method according to claim 3, wherein the compound is administered orally in amounts of 100 mg to 400 mg per kilogram animal body weight.

6. A method according to claim 1 for the control of ixodid ticks, wherein the compound is introduced into the animal's circulatory system by a subcutaneous, intramuscular or intraperitoneal injection.

7. A method according to claim 6, wherein the compound cyclopropanecarboxylic acid, 3-(2,2-dichlorovinyl)-2,2-dimethyl-m-phenoxybenzyl ester cis-trans isomers is introduced into the animals circulatory system in amounts of 0.01 mg to 600 mg per kilogram animal body weight.

8. A method according to claim 6, wherein the compound cyclopropanecarboxylic acid, 2,2-dimethyl-3-(2-methylpropenyl)-m-phenoxybenzyl ester, cis-trans isomers is introduced into the animals circulatory system in amounts of 0.01 mg to 600 mg per kilogram animal body weight.

9. A method according to claim 7, wherein said compound is introduced into the animals circulatory system in amounts of 100 mg per kilogram animal body weight.

10. A method according to claim 8, wherein said compound is introduced into the animal's circulatory system in amounts of 100 mg to 400 mg per kilogram animal body weight.

11. A method according to claim 1 for the control of ixodid ticks wherein the compound is incorporated in a nutritionally balanced animal feed in amounts of 0.01% to 2.5% by weight of feed.

12. A method according to claim 11, wherein the compound cyclopropanecarboxylic acid, 3-(2,2-dichlorovinyl)-2,2-dimethyl-m-phenoxybenzyl ester, cis-trans isomers is incorporated in amounts of 0.01% to 1.0% by weight of feed.

13. A method according to claim 11, wherein the compound cyclopropanecarboxylic acid, 2,2-dimethyl-3-(2-methyl-propenyl)-m-phenoxybenzyl ester, cis-trans isomere is incorporated in amounts of 0.01% to 1.0% by weight of feed.

14. A method according to claim 1 for the control of ixodid ticks wherein the compound cyclopropanecarboxylic acid, 3-(2-2-dichlorovinyl)-2,2-dimethyl-α-cyano-m-phenoxybenzyl ester, cis and trans isomers is administered orally in amounts of 0.01 mg to 600 mg per kilogram animal body weight.

15. A method according to claim 1 for the control of ixodid ticks wherein the compound cyclopropane carboxylic acid, 2,2-dimethyl-3-(2-methyl-propenyl)-α-cyano-m-phenoxybenzyl ester cis and trans isomers is administered orally in amounts of 0.01 mg to 600 mg per kilogram animal body weight.

* * * * *